Nov. 12, 1940.                 E. T. KINDT                 2,221,141
                                DOWEL PIN
                            Filed April 1, 1940
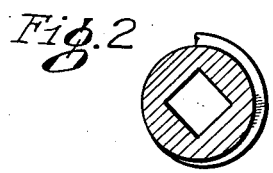
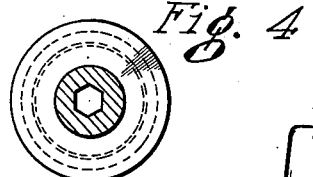
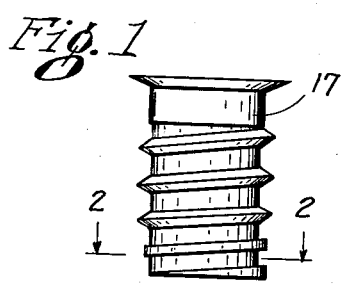
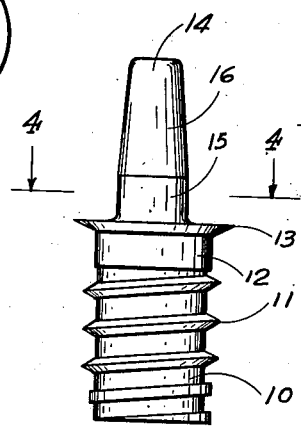
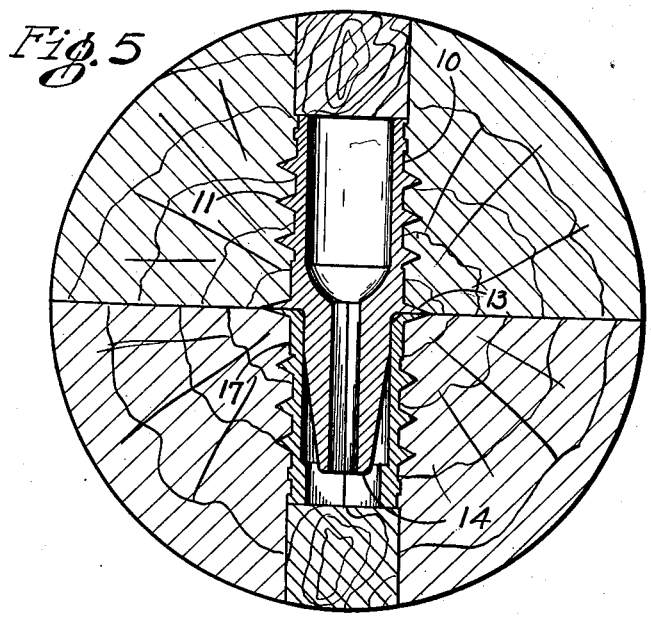
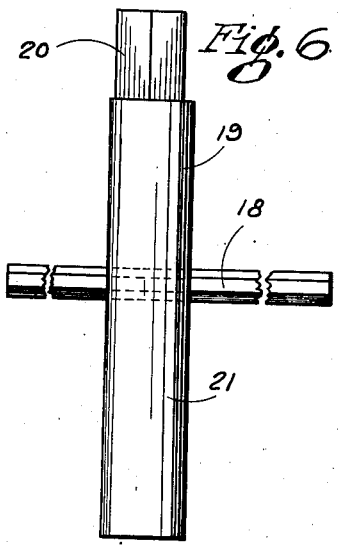
INVENTOR.
ERNEST T. KINDT.
ATTORNEYS.

UNITED STATES PATENT OFFICE 2,221,141

DOWEL PIN

Ernest T. Kindt, Lakewood, Ohio, assignor to The Kindt-Collins Co., Lakewood, Ohio, a corporation of Ohio Application April 1, 1940, Serial No. 327,169

2 Claims. (Cl. 22—158)

This invention relates broadly to metal dowel pins of the type used in patterns, core boxes and similar structures to effect the aligned relation of the removable parts thereof and more specifically to improvements in dowels of the form exemplified in my prior Patent No. 1,455,793, issued May 22, 1923.

In dowel pins of the type contemplated herein it is essential that the engaging surfaces of the pin and dowel bushing be smooth, even and free of driving complements which tend to subvert the reentrant engagement of the respective parts of the assembly. It is also essential that the dowel members be designed to accommodate the repeated removal thereof from the bodies with which they are associated without mutilation of the dowel or fracture of the material within which they are seated.

The primary object of the invention is to provide a dowel pin construction which comprehends the foregoing structural and functional essentials of design and which in addition is economic of manufacture, light in weight and adapted for ready assembly in the work.

Other objects and advantages more or less ancillary of the foregoing and the manner in which all the various objects are realized will appear in the following description which, considered in connection with the accompanying drawing, sets forth the preferred embodiment of the invention.

In the drawing:

Fig. 1 is a side elevational view of the improved dowel pin guide bushing embodied within the present invention;

Fig. 2 is a transverse section through the bushing illustrated in Fig. 1, the section being taken on the plane 2—2 in Fig. 1;

Fig. 3 is a side elevational view of the improved dowel pin;

Fig. 4 is a transverse sectional view through the upper portion thereof, the section being taken on the plane indicated by the line 4—4 in Fig. 3;

Fig. 5 is a vertical section through the improved dowel illustrated in Figs. 1 and 3, showing the assembled relation of the dowel parts with each other and with the work pieces united thereby; and Fig. 6 is an elevational view of the wrench used to screw the dowel pin and bushing in the work.

As illustrated in Figs. 3 and 5, the dowel pin comprises a body portion 10 having a thread 11 formed thereon, which is preferably of a sharp V form and of a relatively coarse pitch. As illustrated the crest of the first two convolutions of the thread 11 are reduced in diameter to the size of the lead drill used in boring the work for the assembly of the dowel. The portion of the body above the thread 11 is machined to form a land 12 which is provided to assure the support of the dowel in coaxial alignment with the bored recess in the work. Above the land 12 there is a flange 13 having the lower face thereof beveled for compressive deformation of the fibers of the work when the dowel is screwed therein so that the top of the flange may be drawn flush with the surface of the work upon assembly of the dowel. The end of the dowel is formed with a pilot pin 14 embodying a cylindrical bearing portion 15 and a guide stem 16. The bearing 15 is machined for sliding engagement without appreciable lateral movement within a thimble or guide bushing 17, constituting a companion member of the dowel assembly. The guide stem 16 is tapered and formed with rounded corners in the free end thereof to facilitate its ready assembly within the guide bushing 17. The dowel pin is bored throughout its length, the pilot pin 14 thereof being broached to accommodate the use of a pin wrench, such for example, as the hexagonal bar 18 illustrated in Fig. 6. The body of the dowel pin is preferably counterbored in order to reduce the weight thereof. As shown in Figs. 1 and 5, the lower external portion of the guide bushing 17 is formed as the counterpart of the body of the dowel pin 10. The bushing 17 is also bored throughout its length, the upper portion of the bore being adapted for engagement with the dowel pin bearing 15 and the guide stem 19 of the pin wrench therefor while the lower portion of the bushing is drilled and broached for the reception of the driving complement 20 of the pin wrench 21. The wrench, as illustrated, is preferably formed of two bars, the pin or bar 18 of lesser diameter being secured within an opening cross drilled in the body of the bar 21 so that each member may provide a lever arm handle for the other.

After the stock has been drilled the dowel members may be screwed into the respective parts thereof by application of the appropriate ends of the wrench 21; the pin 18 being operatively engaged within the broached opening in the pilot 14 and the polygonal end of the wrench 21 being operatively engaged within the broached end portion of the bushing 17 with the stem 19 thereof guided in the pilot bearing to protect the surface thereof.

It will be readily recognized that in the assembly of either the dowel pin or bushing the driving effort is applied upon surfaces which are remote from the engaged or contacting faces of the pin and guide bushing and that even though the parts are subjected to repeated removal or abusive use of the driving tools no injury from such source could occur which would subvert the entry of the pin within the bushing or mutilate the abutting flanges of the respective members of the dowel bushing assembly in such a manner as to impair the function thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A dowel construction comprising, a pilot pin and a guide bushing, each having a screw thread formed upon a portion of the outer surface thereof, said pilot pin embodying a bearing portion and a guiding portion, each of which is formed with smooth uninterrupted surfaces, said guiding portion having a broached axial opening in the end thereof for the reception of a driving tool, said bushing having a smooth, uninterrupted axial bore in one end thereof for the reception of the bearing portion of said pilot pin and a reduced broached opening in the opposed end thereof for the reception of a driving tool.

2. A dowel structure comprising a screw threaded pilot pin member and a screw threaded bushing member, said pilot pin member having an opening in the inner end thereof configured for the reception of a driving tool, a cylindrical bearing portion and a tapered portion on the inner end of said pin, said bushing member having an opening therein for the reception of the pin and engageable with the cylindrical bearing portion thereof and having a second opening of lesser diameter disposed subjacent thereto and configured for the reception of a driving tool.

ERNEST T. KINDT.